United States Patent [19]

Hayes

[11] Patent Number: 4,946,589
[45] Date of Patent: Aug. 7, 1990

[54] HIGH VOLUME PERMANENT MAGNET FILTER FOR REMOVING FERROMAGNETIC IMPURITIES

[75] Inventor: James K. Hayes, Chattanooga, Tenn.

[73] Assignee: Combustion Engineering, Inc., Windsor, Conn.

[21] Appl. No.: 20,324

[22] Filed: Feb. 27, 1987

[51] Int. Cl.$^5$ ............................................. B01D 35/06
[52] U.S. Cl. ..................................... 210/222; 55/100;
   209/223.1; 209/229; 209/232; 209/385;
   210/232; 210/408; 210/409; 210/446; 210/456
[58] Field of Search .................... 209/223 R, 224, 228,
   209/229, 232, 379, 380, 385; 210/222, 223, 695,
   232, 241, 408, 409, 435, 446, 456; 55/100

[56] References Cited

U.S. PATENT DOCUMENTS

| | | | |
|---|---|---|---|
| 3,680,705 | 8/1972 | Happ et al. | 210/222 |
| 3,923,660 | 12/1975 | Kottmeier | 210/222 |
| 4,251,372 | 2/1981 | Dolle | 210/222 |

Primary Examiner—W. Gary Jones
Attorney, Agent, or Firm—Chilton, Alix & Van Kirk

[57] ABSTRACT

A permanent magnetic filter is provided in a form that includes a closed vessel having an inlet plenum, a central filtering region, and an exit plenum. The central filtering region includes a plurality of magnet filter tubes arranged in a substantially uniform array that is supported in a manner which achieves satisfactory filtering, minimizes fluid pressure drop, and permits easy cleaning.

23 Claims, 9 Drawing Sheets

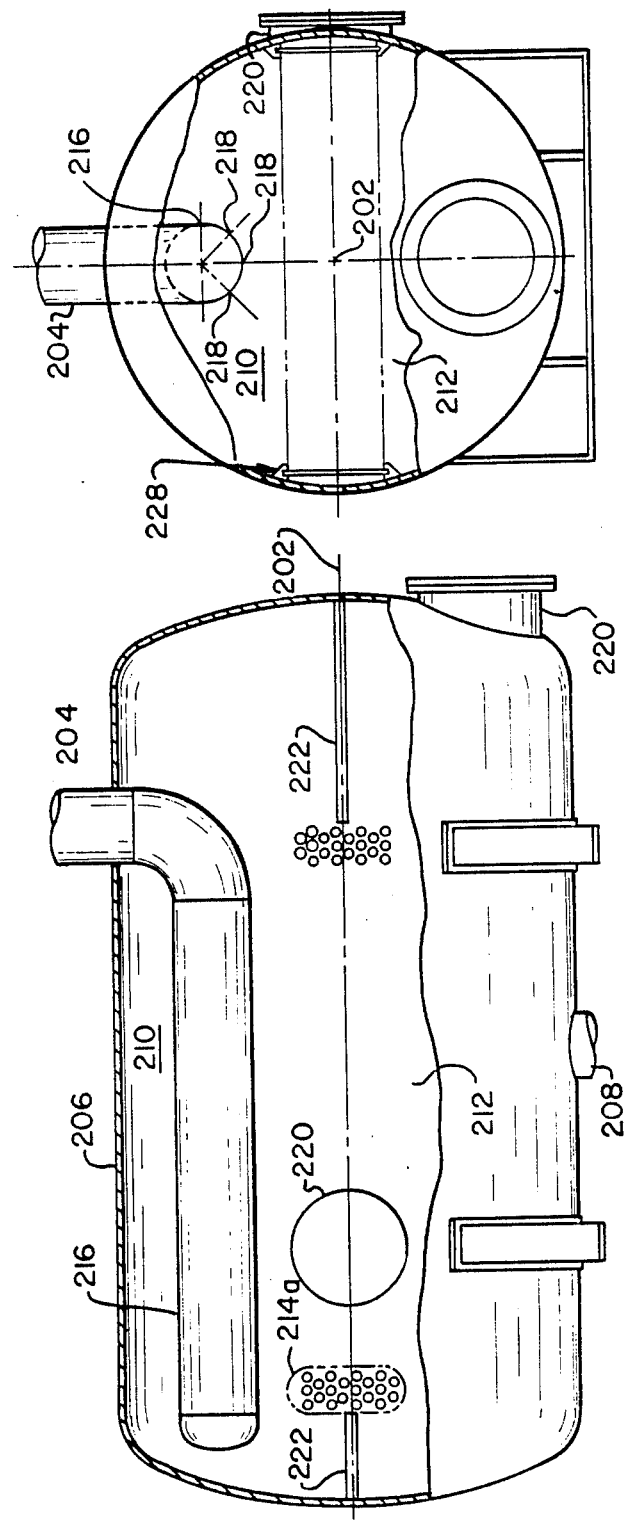

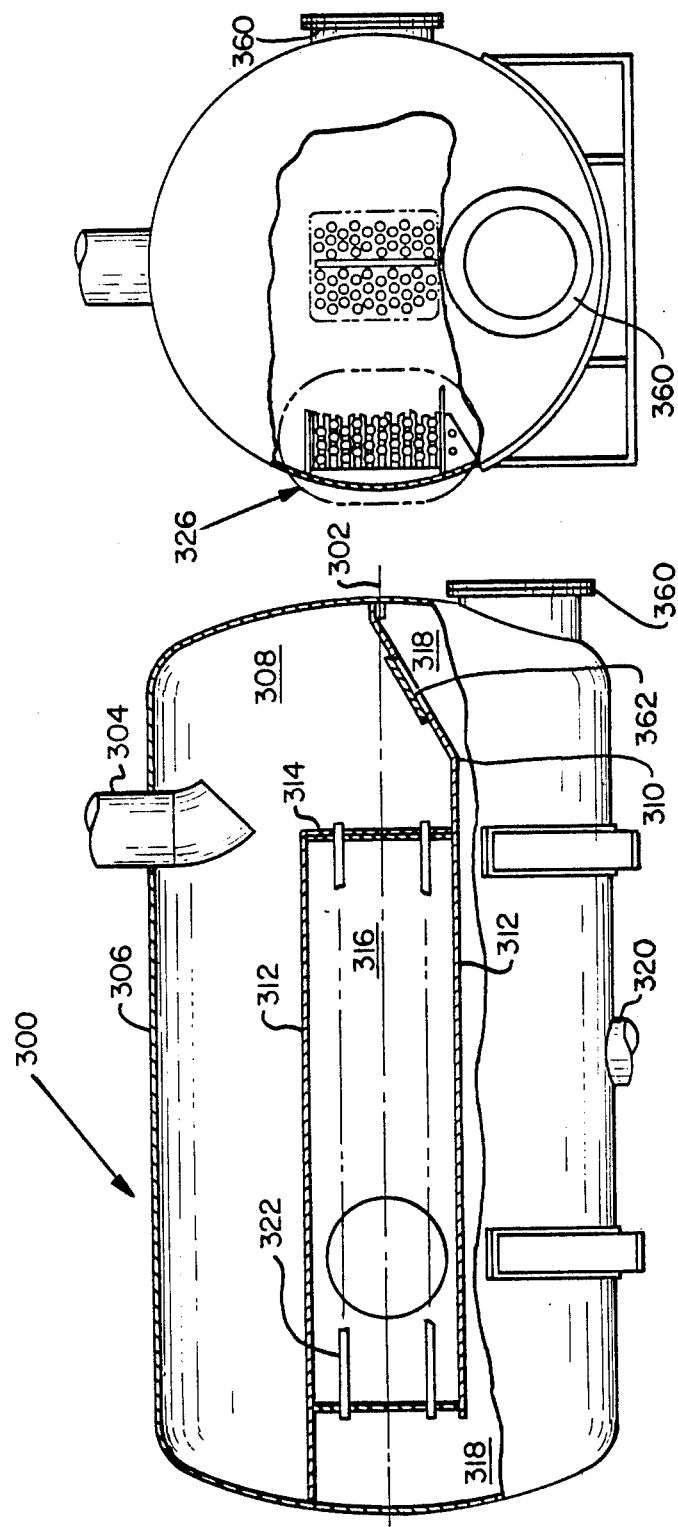

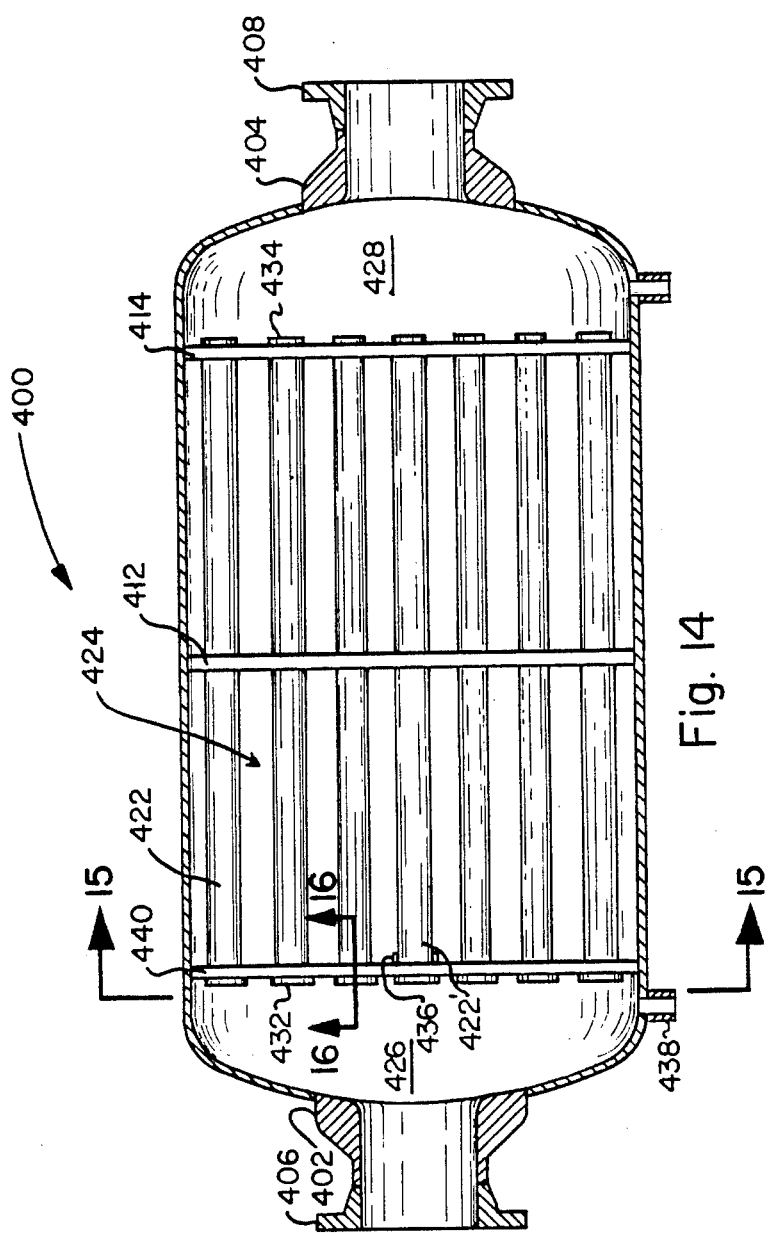

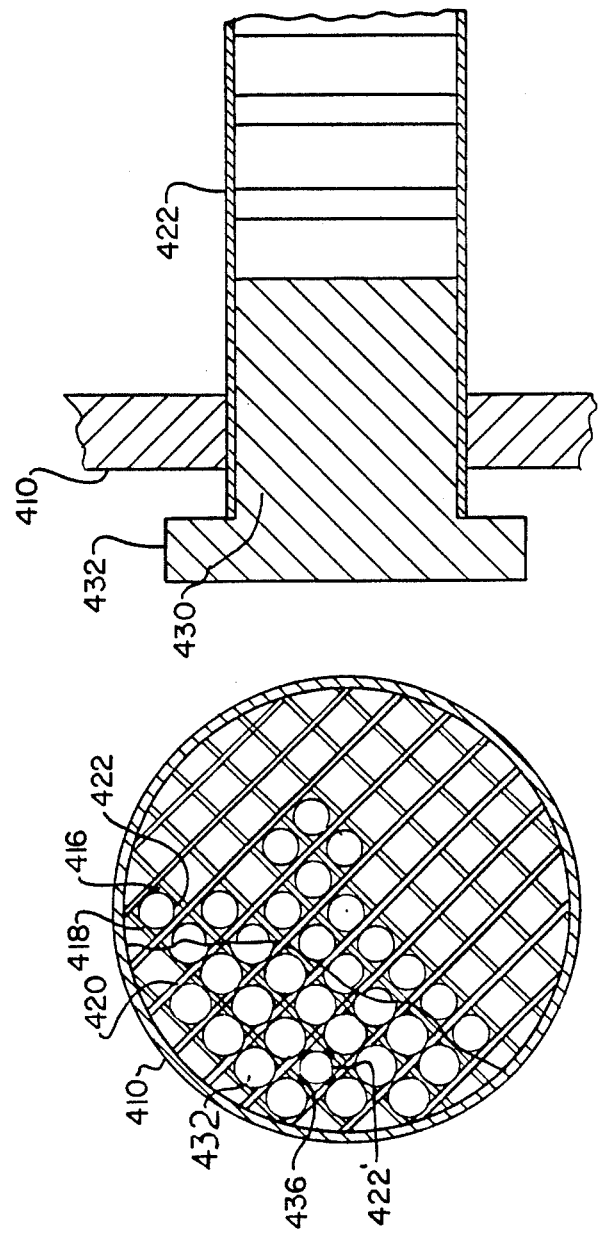

HIGH VOLUME PERMANENT MAGNET FILTER FOR REMOVING FERROMAGNETIC IMPURITIES

This invention relates to permanent magnet filters, and more particularly, such filters for use in treating condensate and/or feedwater in nuclear and fossil power plants.

A variety of theoretical analyses and laboratory testing have been performed in support of the development of satisfactory permanent magnet filters for use in power plants. Such prior work is summarized, for example, in the IEEE Transactions on Magnetics, Volume Mag 18, No. 6, November 1982. The patent literature includes the following U.S. patents which relate generally to magnetic filtering techniques:

| U.S. Pat. No. | Inventor | Date |
| --- | --- | --- |
| 3,206,657 | Moriya | 9/14/65 |
| 3,139,403 | Cramer et al | 6/30/64 |
| 4,043,864 | Heitmann | 8/23/77 |
| 4,216,092 | Shalhoob et al | 8/5/80 |
| 4,366,053 | Lindler | 12/28/82 |
| 4,306,970 | Tanaka et al | 12/22/81 |
| 2,915,186 | Johannesen | 12/1/59 |

The prior art techniques suffer from one or more deficiencies that have limited the use of magnetic filtering systems in fossil and nuclear power plants. These deficiencies include inadequate means for filtering large volumes of condensate or feedwater flow inappropriate arrangement and spacing of the magnetic elements, which adversely affects the pressure drop through the filter, and difficulties in periodically removing the sludge deposits and cleaning the filter internals.

SUMMARY OF THE INVENTION

In accordance with the present invention, a permanent magnetic filter is provided in a form that includes a closed vessel having an inlet plenum, a central filtering region, and an exit plenum. The central filtering region includes a plurality of magnet filter tubes arranged in a substantially uniform array that is supported in a manner which achieves satisfactory filtering, minimizes fluid pressure drop, and permits easy cleaning.

In one embodiment, the vessel is vertically oriented and the tubes are likewise vertically oriented within the vessel. The tubes are attached at their tops to a tube sheet which in turn is supported between a removable head and a vessel body. A sludge removal ring surrounds each tube at the underside of the tube sheet. When the filter is to be cleaned, the head and tube sheet are lifted, thereby raising the tubes in unison. As the tubes slide through their respective sludge removal rings, the sludge deposits are scraped off the tubes and fall to the bottom of the vessel from which they can readily be extracted.

In another embodiment, the vessel is horizontally oriented and the magnet tubes are also horizontally oriented. This embodiment may have two variations, one in which the tubes are parallel to the longitudinal axis of the vessel, and the other in which the tubes lie transverse to the longitudinal axis. In both variations of this embodiment, the tubes are spaced and supported by scalloped bars which are slidingly received in slotted plates in the internal side walls of the vessel. When the filter is to be cleansed, the vessel is drained of fluid and the tubes are accessed through a port in the side wall of the vessel. The support bars are easily removed from the slots so that the tubes can be individually removed from their support and cleaned. Reassembly of the tubes and bars is quickly accomplished due to the simplicity of the mounting between the bars and the vessel wall, and between the tubes and the bars.

Each magnetic filter tube in accordance with the invention comprises a sealed nonmagnetic cylindrical outer housing containing a plurality of stacked magnetic slugs, each slug separated from an adjacent slug by a nonmagnetic disk. The slugs are alternatingly oriented so that the closest surfaces of adjacent slugs are of the same polarity. Preferably, the spacers are carbon steel. In a preferred implementation, the tube outer diameter is about 2.0 inches and the tubes are arranged in an array having a triangular pitch with the tube centerlines spaced by about 2.5 inches. The resulting magnetic field has an effective diameter of about 2.5 inches. With this arrangement of tubes, and with an axial fluid velocity of about 1 ft./sec. at 70 degrees F., the corrosion products captured will reach a maximum of about 1.1 lbs./ft.sq. if strontium ferrite magnets are utilized. Thus, in a filter system in which each magnet tube is approximately five feet in length, it is possible to collect up to about 2.9 pounds of sludge per tube.

The present invention can filter a large volume of water with a small pressure drop. The filter has sufficient capacity to catpure and retain 73 to 75% of all magnetite that is passing through the filter thus preventing these corrosion products from entering the nuclear steam generator during a normal operating cycle of 12 to 14 months. Stripping and cleaning of the filter can be performed during a normal refueling outage. Another advantage of the filter is that no power is required to operate it such as necessary with electro-magnetic filters. In addition it is a simple mechanical design and will not cause any appreciable maintenance problems. The filter according to the invention can also be used for removing impurities from the main turbine lubricating oil system.

BRIEF DESCRIPTION OF THE DRAWINGS

These and other features and advantages of the invention will be described more fully below with reference to the accompanying drawings in which:

FIG. 5 is a side view partly in section of a second embodiment of the invention in which the vessel is horizontally oriented and the magnet tubes are mounted transversely to the longitudinal axis of the vessel;

FIG. 6 is an elevation end view of the filter embodiment of FIG. 5;

FIG. 9 is a side view, partly in section, of another embodiment of the invention, in which the magnet tubes are oriented parallel to the longitudinal axis of the vessel;

FIG. 10 is an end view, partly in section, of the filter embodiment illustrated in FIG. 9;

FIG. 14 is an elevation side view of another embodiment of the invention;

FIG. 15 is a section view, taken along line 15—15 of FIG. 14, showing the egg-crate internal support for the magnet tubes;

FIG. 16 is a detailed view of the relationship between the upstream end of a magnet tube and the upstream egg-crate support, of the embodiment shown in FIG. 14.

DESCRIPTION OF THE PREFERRED EMBODIMENTS

The preferred embodiments of the present invention will be described with reference to permanent magnet filters capable of removing a significant portion of the corrosion products from the secondary system fluids of a fossil or nuclear power plant. More particularly, the filters described herein are for use in the feed train rather than in the steam generators per se. It should be understood, however, that the invention as claimed includes embodiments for filtering primary system fluids as well.

Figure 1:
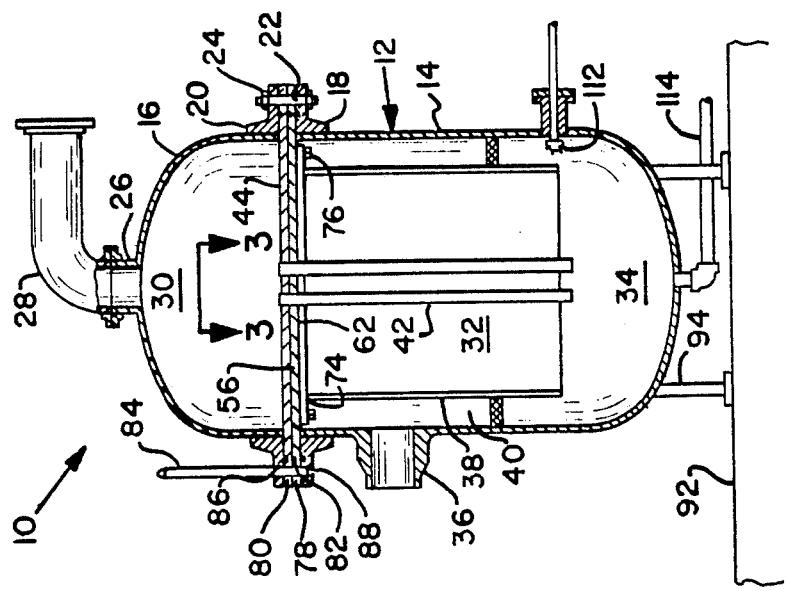
FIG. 1 is an elevation section view of a vertically oriented, pre-start-up filter in accordance with one embodiment of the invention.

FIG. 1 illustrates a vertically oriented filter 10 suitable for use during pre-start-up of the power plant. The description to follow is made with reference to a filter designed for a 3,000 gpm flow rate, although it should be understood that such filters can be used in parallel to accommodate larger flow rates.

The exterior of the filter is in the form of a closed vessel 12 which has a body portion 14 and a detachable head portion 16. The head 16 includes an annular head flange 20 and the upper portion of the body 14 includes a body flange 18. The flanges have aligned holes 22 through which closure studs 24 are tightened to maintain pressure within the vessel 12. In FIG. 1, only one stud 24 is shown, but it should be understood that these are spaced around the flanges at appropriate intervals.

The head portion 16 has an inlet nozzle 26 connected thereto which is in turn connected to a supply pipe 28 for bringing in the fluid to the filter 10. The fluid enters the inlet plenum 30 which is at the upper end of the vessel. The fluid flows downwardly through the filtering region 32 into the exit plenum 34, which is fluidly connected with the outlet nozzle 36. A generally cylindrical flow skirt 38 surrounds the filtering region 32 and defines an exit flow annulus 40 connecting the exit plenum 34 to the outlet nozzle 36. In the illustrated embodiment, the raw inlet fluid in pipe 28 is taken from the discharge of the steam generator feedwater pump (not shown) and the filtered water is sent through nozzle 36 to the condenser hot well (not shown).

Within the filtering region 32, a multiplicity, e.g. 225, of magnet filter tubes 42 are longitudinally arranged and spaced apart so that the fluid may flow downwardly from the inlet plenum 30 to the exit plenum 34. The tubes 42 are rigidly connected to a tube sheet 44 which spans the vessel between the head 16 and body portion 14. Around the tubes 42, a multiplicity of localized magnetic fields with high field gradients, as more fully described below, extract paramagnetic material from the fluid, by attracting it to the tubes.

Figure 2:
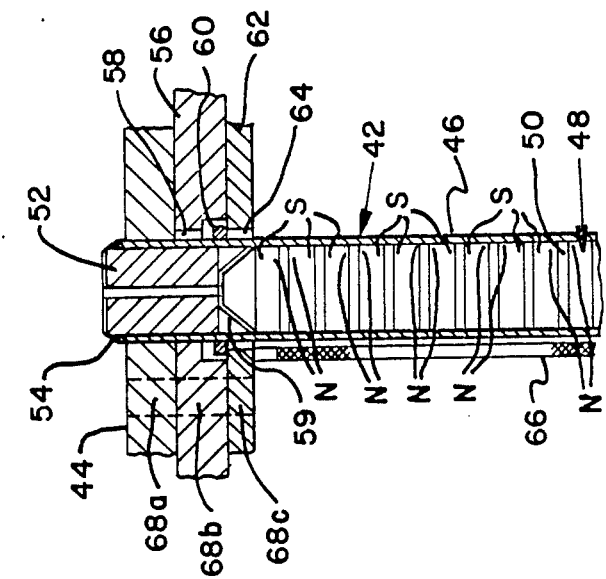
FIG. 2 is a vertical section view of the mounting of an individual magnet tube to the tube sheet and associated plates within the filter vessel of FIG. 1.
Figure 3:
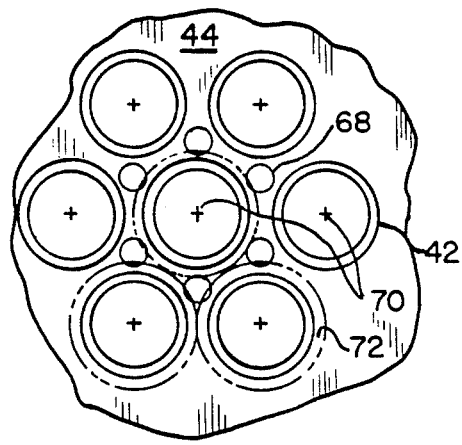
FIG. 3 is a plan view along lines 3—3 of FIG. 1, showing the mounting pattern of the magnet tube and associated flow holes through the tube sheet.

With reference to FIGS. 1–3, the preferred mounting and spacing array of the magnet tubes will be described in greater detail. Each tube 42 comprises a nonmagnetic cylindrical housing 46 with the upper end thereof connected to the tube sheet. Magnetic slugs 48 are stacked within the housing 46 with nonmagnetic spacer disks 50 located between each slug. The magnet slugs 48 are preferably strontium ferrite, but Alnico and other materials are also possible. The magnet slugs 48 are alternately oriented so that the closest surfaces of adjacent slugs are of the same polarity, as indicated by the neighboring "N" poles and neighboring "S" poles in FIG. 2. The housing 46 may be sealed at both ends or an equalizing pressure hole may be provided in one plug. The equalizing pressure hole will make it feasible to make the outer housing of minimum wall thickness since the internal and external pressure will be equalized, the upper end shown in FIG. 2 having an end plug 52 seal-welded to the housing at 54. A Belleville washer 59 or similar spring is interposed between the end plug 52 and the stack of slugs to allow for differential thermal expansion between housing and internal components.

A ring support plate 56 having counter bored apertures 58 is located immediately below the tube sheet 44. The aperture 58 around each tube housing 46 contains a sludge removal split ring 60 for wiping the tube 42 in a manner to be described below. Immediately below the ring support plate 56 is located a ring locking plate 62 which also has apertures 64 of a smaller diameter than the portions of apertures 58 in which the rings 60 are located. The ring locking plate 62 assures that the ring 60 remains in position around the tube 42. A mesh screen 66 may optionally be attached to the underside of the ring locking plate 62 for surrounding the magnet tube 42.

The tube sheet 44 separates the inlet plenum 30 from the filtering region 32, with fluid communication therebetween provided by flow holds 68. It should be understood that these flow holes are provided through each of the tube sheet 44, ring support plate 56 and ring locking plate 62, as indicated by numeral identifiers 68a, 68b, and 68c in FIG. 2 where the flow holes are shown as dashed lines.

Figure 4:
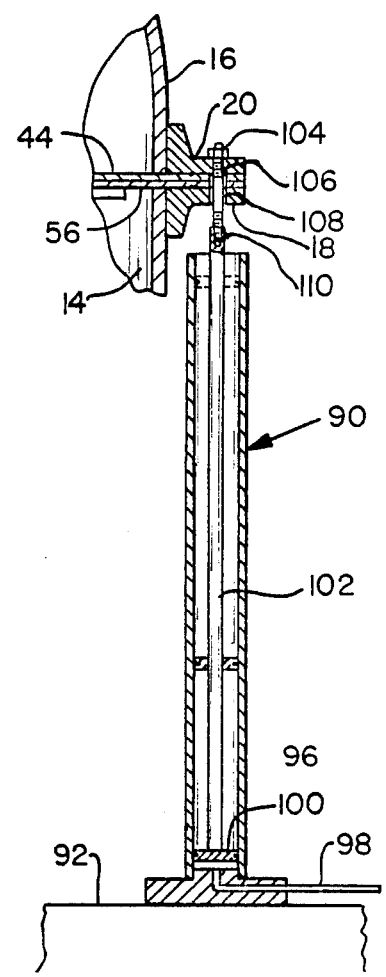
FIG. 4 is an elevation view of the hydraulic jacking device used with the embodiment of the invention shown in FIG. 1 for raising the vessel head and tube sheet with magnet tubes during the cleaning of the filter.

As shown in FIG. 3, the preferred array or pattern of the tubes 42 is on a triangular pitch with respect to the centerlines 70 of neighboring tubes. In a typical filter, the tubes have an outer diameter of 2.0 inches and their center-to-center spacing is 2.5 inches. The flow holes 68 are of smaller diameter, e.g., about one-half inch in diameter. The tank, magnet tubes and holes are generally sized such that the flow velocity through the flow holes does not exceed 10 ft/sec. After passing through the holes 68 into the filtering region 32, the axial flow velocity is reduced to about 10% of the above flow. In this arrangement and with the use of strontium ferrite magnets, the magnetic field 72 has an effective diameter of about 2.5 inches. In filters of the type described herein, the tube diameters would generally be in the range of 2.0–3.0 inches, arranged in uniform triangular array having center-to-center spacing in the range of about 2.5–3.0 inches. When it has been determined that the accumulation of corrosion deposits on the filter tubes 42 has reached a maximum (i.e., the filter will no longer be effective), the filter tubes 42 are scraped clean of the deposits by lifting them out of the vessel body 14, whereby the wiper rings 60 scrape off the deposits, which then fall to the bottom of the exit plenum 34. For a better understanding of this feature of the invention, specific reference will be made to FIGS. 1 and 4. In FIG. 1, it can be seen that the flow skirt 38 is welded to the ring locking plate 62. The outer rim 74 of the locking plate 62 is in turn bolted at 76 to the ring support plate 56. Preferably, the outer rim 74 of the ring locking plate has a smaller outer diameter than the inside diameter of the vessel body portion 14. The outer diameter 78 of the ring support plate 56 and the outer diameter 80 of the tube sheet 44, extend to the flanges 18, 20 and are trapped therebetween with O-rings 82. Two alignment pins 84 are located 180 degrees apart by weldment 88 to the body flange 18 while freely passing through opening 86 in the head flange 20. The alignment pins extend vertically above the flange 20 and provide guidance when the head 16 is detached from the body portion 14 and lifted.

The tube sheet 44 with tubes 42 attached thereto, is also guided by the alignment pins 84 as the tube sheet 44 is lifted above the body portion 14 over a distance slightly less than the length of the tubes. The tube sheet 44 may either be fixed to the head 16 so that they may be lifted simultaneously, or the tube sheet 44 may be separate from the head 16 and lifted sequentially after the head.

In accordance with another feature of the invention, a hydraulic jack 90 is interposed between the floor 92 on which the vessel legs 94 are supported, and the head flange 20. An hydraulic cylinder 96 extends from the floor 92 to an elevation below the flange 18. A hydraulic line 98 supplies hydraulic fluid to acutate a piston 100 which is connected to rod 102. At preferably three locations in the flanges 18, 20, in ligaments (not shown) between the stud holes 22 on the flanges, lifting bolts 104 are threaded 106 to the head flange 20 but pass through the tube sheet 44, ring support plate 56, and body flange 18, within a sleeve 108. The lower end of the bolt is threaded at 110 to the upper end of the rod 102.

Thus as the piston 100 is lifted through the cylinder 96, the rod 102 lifts the flange 20 and vessel head 116. The threads 106 on bolt 104 could extend to the tube sheet 44 if the tube sheet is to be lifted simultaneously with the head 16. As the tube sheet 44 is lifted, the tubes 42 rise in unison through their respective rings 60.

After the tubes 42 have been lifted and the sludge deposits scraped off the tubes, a multiple spray head 112 or the like installed through the side wall of the vessel is actuated to wash down the vessel walls and other internal structures. The sludge falls to the bottom of the vessel and is easily removed by a sludge suction pipe 114. The tube sheet 44 and head 16 are lowered and secured preparatory to the resumption of the filtering of fluid from pipe 28.

FIGS. 5–8 illustrate a heater drain tank filter embodiment of the invention, wherein the filter vessel 200 is horizontally oriented along a longitudinal axis 202. An inlet nozzle 204 enters the top 206 of the vessel and the direction of fluid flow is from the top to the bottom and out the outlet nozzle 208. The upper portion of the vessel forms an inlet plenum 210 and the lower portion forms an outlet plenum 212 with the filter region 214 interposed therebetween. A inlet distribution header 216 extends from the inlet nozzle 204 longitudinally through the inlet plenum 210, and has a plurality of distribution holes 218, preferably located in three longitudinal rows, one oriented vertically and the other two at 45 degrees from the vertical. Acess ports 220 are provided on an end and at the side of the vessel, leading to the filter region 214. Front and rear baffles 222 maintain the separation between the inlet plenum 210 and the outlet plenum 212, in front of and behind the filter region 214. The magnet tubes 224 are oriented transversely to the longitudinal axis 202, such that the fluid flows from the upper plenum 210 to lower plenum 212 across, rather than axially along the tubes 224. The construction of the magnet tubes in the second embodiment is substantially identical to that described with reference to FIG. 2.

Figure 7:
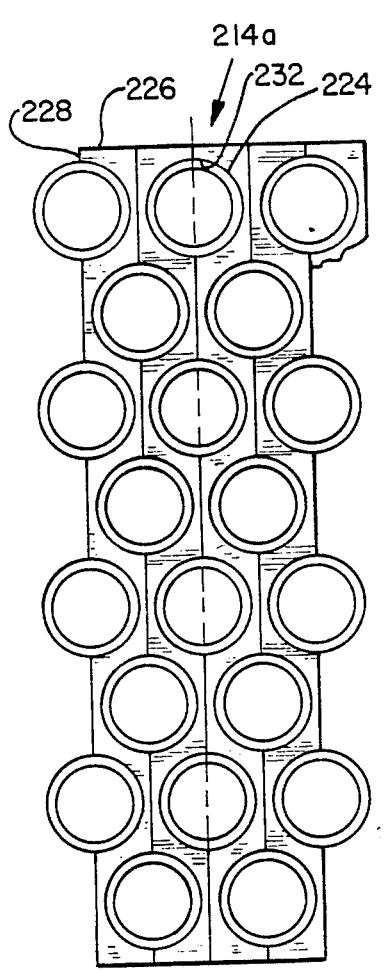
FIG. 7 is a detailed view of the scalloped support bars for mounting the magnet tubes within the vessel shown in FIG. 5.
Figure 8:
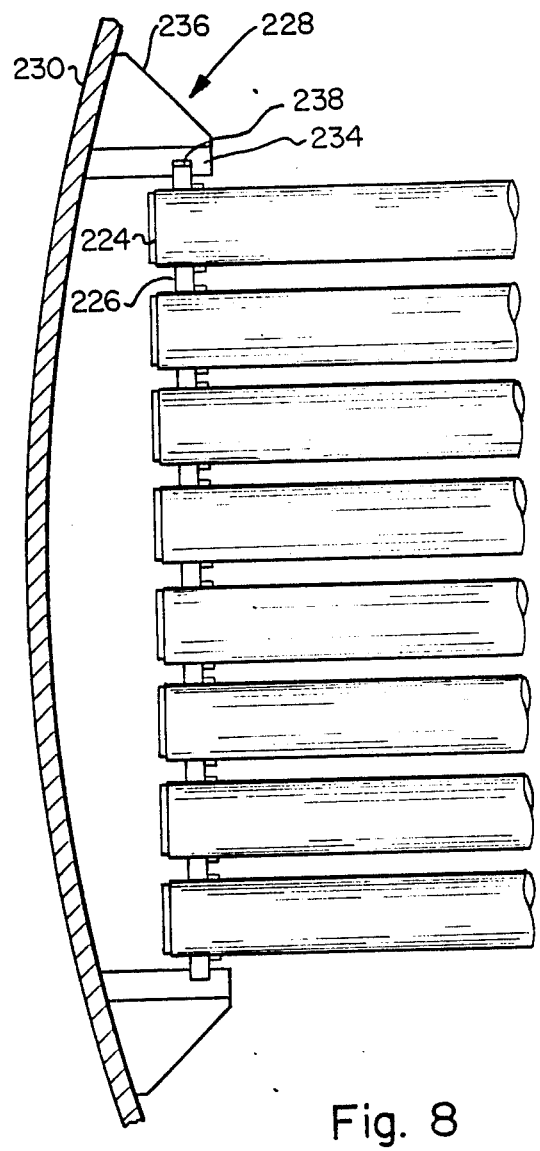
FIG. 8 is a detailed view of the manner in which the support bars are mounted to the slotted plates in the side walls in the vessel shown in FIGS. 5 and 6.
Figure 11:
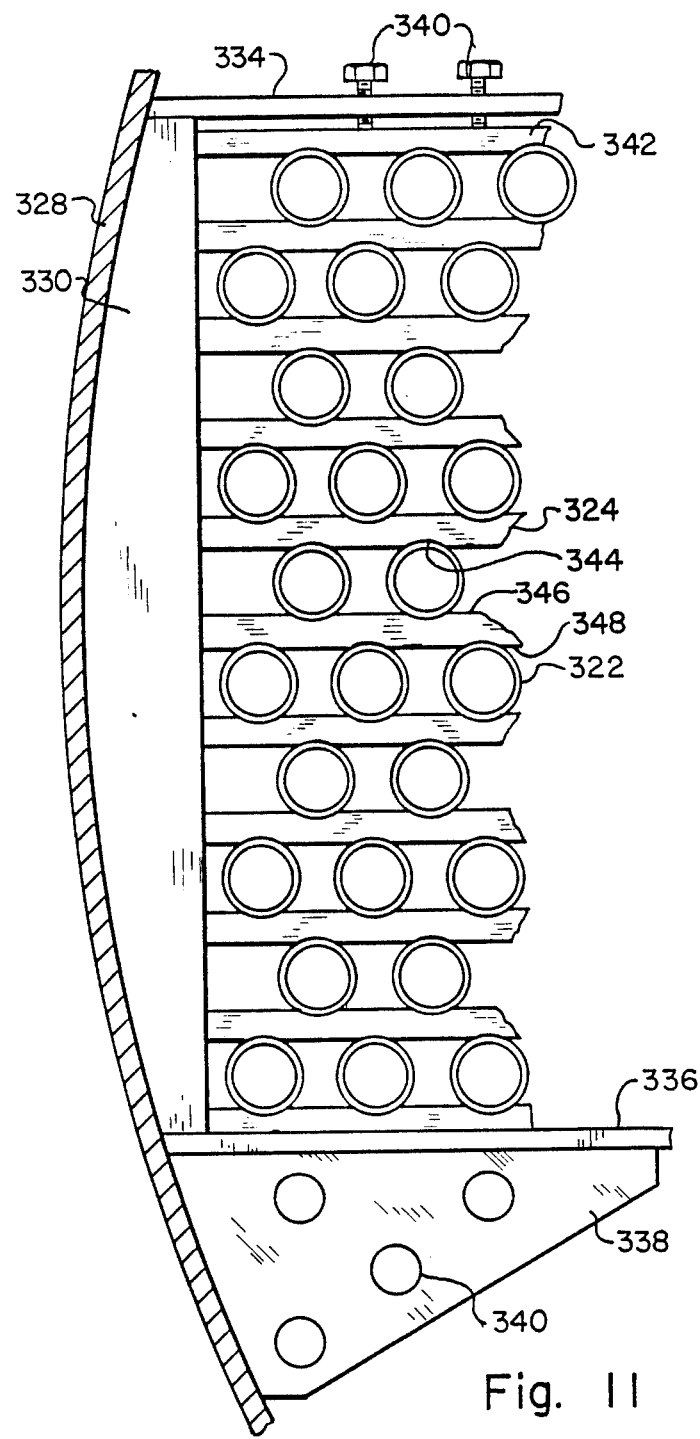
FIG. 11 is a detailed view of the scalloped support bars for mounting the magnet tubes in the embodiment shown in FIGS. 9 and 10.

A portion of the filter region, identified as 214a in FIG. 5, is shown in detail in FIG. 7. The tubes are supported by a plurality of spacer bars 226 which are in turn vertically supported by the vessel wall. Each bar 226 has two vertical sides 228, 230, which are scalloped, as at 232 so that preferably each scallop 232 is semi-circular and contacts approximately one half the circumference of a tube 224. The scallops are staggered between the sides 228, 230, whereby a triangularly pitched array of tubes is supported. If a magnet tube of two inches is used with this embodiment, the preferred center-to-center spacing between tubes is approximately three inches. Thus, adjacent bars are virtually in contact and define a plurality of substantially circular openings for circumscribing a plurality of tubes.

The bars 226 are supported at their vertical ends by slotted plates 234 which are rigidly supported by structural bosses 236 projecting from the vessel side walls. The slot 238 in the slotted plate 234 provides sufficient clearance so that the bars 226 may be inserted easily during the initial assembly of the filter and during subsequent cleaning operations.

When it has been determined that the tubes 224 have accumulated their capacity of corrosion products, the vessel is drained through pipe 242 and the filter region 214 is accessed through the ports 220. Each tube is removed by reversing the assembly operation. The tubes 224 may then be cleaned and the inside walls washed before the filter is completely reassembled. It should be appreciated that during the assembly and disassembly of the filter, temporary support devices (not shown) may be needed to hold the magnet tubes 224 in place until the next scalloped bar 226 is installed or while the next bar is being removed.

FIGS. 9–13 illustrate a third embodiment of the invention, which is a variation of the horizontal embodiment described above. The third embodiment has a horizontal vessel 300 with a longitudinal axis 302 along which the fluid is filtered. An inlet nozzle 304 enters the vessel through the top wall 306 and introduces fluid into the inlet plenum 308. Baffles 310, 312 direct the inlet fluid towards the filter inlet plate 314, which forms the entrance to the filter region 316. The fluid travels axially through the filter region 316, enters the outlet plenum 318, and exits the vessel through the outlet nozzle 358.

Figure 12:
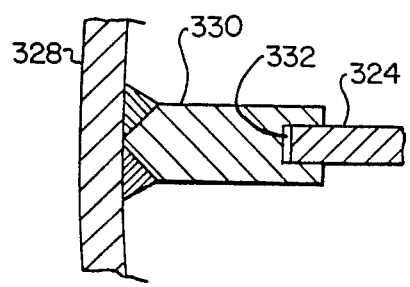
FIG. 12 is a detailed view of the manner in which the scalloped bars are supported in the slotted plate in the side walls of the vessel shown in FIGS. 9 and 10.

In this embodiment, the magnet tubes 322 are horizontally oriented parallel to the longitudinal axis 302. The magnet tubes 322 are fluidly isolated from the plena 308,318 by the surrounding baffle 312. The tubes 322 are supported within the filter region 316 by a plurality of transverse, horizontal spacer bars 324. The side portion of filter region 316 generally indicated at 326, is illustrated in greater detail in FIG. 11. A vertical slotted plate 330 is affixed to or is supported adjacent to the vessel side wall 328 on opposite sides thereof. The plurality of scalloped bars 324 slide into the slots 332 in the plate 330. As shown in FIG. 12, the slotted plate 330 is preferably welded to the side wall and has a slot 332 through which the bar 324 can easily be inserted. An upper filter frame 334 and lower filter frame 336 define the upper and lower boundaries of the filter region and provide vertical support to carry the weight of the magnet tubes 322. These can also serve as baffle 312. The lower filter frame is further structurally supported by a brace 338 which preferably includes a number of axial flow holes 340. Along the upper filter frame 334 are located a plurality of jacking bolts 340 which are tightened against the top bars 342 to take up any vertical clearances between the support bars 324 and the tubes 322, in effect "tightening up" the filter region 316.

Each of the bars 324 is scalloped 344 alternately along the upper 346 and lower 348 sides of the bar. In this embodiment, it is preferable that the scallops 344 be relatively shallow, i.e., span an arc of less than about 90 degrees. Generally, the bar 324 in this embodiment is approximately equal to the tube radius, whereas in the embodiment described with respect to FIGS. 5–8, the bar width is generally greater than the tube radius.

Figure 13:
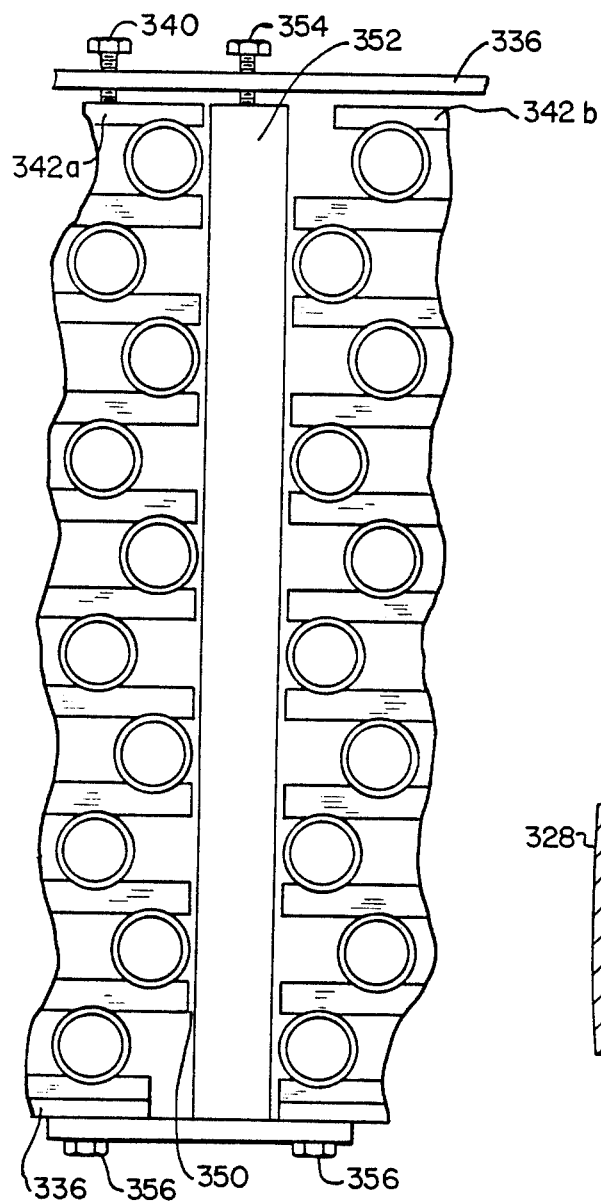
FIG. 13 is a detailed view of the central portion of the filter region as represented in FIG. 10.

As may best be seen with reference to FIGS. 10 and 13, in this embodiment the filter region 316 is preferably divided into two sections on either side of the axis 302. A rectangular gap 350 is provided at the center of the vessel having a width approximately equal to two tube diameters. The purpose of this gap is to provide for ease of assembly of the magnet tubes. A flow blocker 352 may be inserted therebetween and supported by a separate bolt 354. As can be seen in the lower portion of FIG. 13, locating bolts 356 may be provided at the inner ends of the lower filter frame 336 to engage the bottom bars adjacent the flow blocker 352 in order to provide an additional degree of restraint against displacement of the center portion of the filter region along longitudinal axis 302.

As in the previous embodiments, the preferable orientation of the tubes 322 is on a triangular pitch, with each tube being constructed substantially as shown in FIG. 2.

After the filter has reached capacity, the fluid is removed through the nozzle 320. Access is accomplished through access ports 360 and through the outlet nozzle and removable access cover 362 in baffle 310. The jacking bolts 340 are loosened and the flow blocker 352 removed such that the bars 344 and tubes 322 can be removed for cleaning. The vessel itself can be washed internally through the access ports 360.

It should be appreciated that in order to facilitate the loading and unloading of the tubes, one or more tube support devices may be utilized. For example, a tube support device can be installed on the vessel centerline, the device having end supports with roller bearings such that it can easily accept a magnet tube and push it to the desired location within the vessel. The device may also have the capability of raising the magnet tube to the desired elevation within the vessel. This or another device can be used to move the magnet tubes laterally to the desired location for support on the scalloped bar. Such auxiliary units can easily be designed and fabricated.

Instead of the magnet cleaning procedure described above, a high velocity nozzle may be inserted through access port 360 and access cover 362, and between scalloped bars 344. By starting to spray at the top and rotating the permanent magnet tubes, the corrosion products can be flushed to the bottom of the tank. With this procedure it will not be necessary to remove the permanent magnet tubes for cleaning. During this type of cleaning operation, it will be necessary to temporarily block off the tank drain nozzle 358 and pump water and corrosion products from the tank using a suction hose inserted through access port 360.

FIGS. 14–16 illustrate another embodiment of the invention. A horizontally oriented vessel 400 has horizontally oriented inlet and outlet nozzles 402, 404, respectively, in registry with the vessel axis. Flanges 406, 408 are attached to the nozzles 402, 404 by which fluid connections are established with elbows from, for example, a feedwater heater drain tank condensate pump, and to the feedwater line (not shown), respectively.

At least two egg-crate type tube support grids 410, 412, 414 are rigidly connected to the inner sidewalls of the vessel. Each egg-crate has a plurality of discrete openings 416 defined by intersecting metal bars or strips 418, 420, as shown in FIG. 15. A given opening 416 in support 410 is in longitudinal registry with a corresponding opening (not shown) in supports 412, 414.

The region between the upstream support 410 and downstream support 414 contains an array of spaced-apart, permanent magnet tubes 422 which define the filtering region 424. Raw fluid enters the inlet plenum 426 and passes through the filtering region 424 to the outlet plenum 428. The fluid flow rate is established, for example, by the above-mentioned condensate pump, and is preferably less than about two feet per second.

The tubes 422 are generally of the type described above with reference to the other embodiments, but preferably include a modification whereby the plug 430 at the upstream end is enlarged or flanged 432, so that the plug 430 will not pass through the opening 416 in the upstream support 410. The downstream end 434 of the tube is not sealed or enlarged. In this manner, the tubes 422 are prevented from moving longitudinally with the fluid relative to the supports 410, 412, 414 during operation of the filter, but they are free to rotate, or slide toward the inlet nozzle 402, during cleaning operations. Also, they can expand differentially relative to the supports.

A few of the tubes, e.g., 422', may be tack welded 436 to the supports 410, 412, 414, thereby serving as tie rods to maintain a desired degree of rigidity of the filtering region 424.

After the vessel 400 has been drained, the stripping of the corrosion products can be performed by removing the flanged elbows or other connectors (not shown) at the flanges 406,408 and installing a cover on downstream flange 408. A spray device (not shown) is inserted through inlet nozzle 402, preferably sized to pass through the openings 416 in the supports 410, 412, above a given tube 422. A high velocity jet of water is sprayed on the top surface of the top row of tubes, and the tubes are simultaneously rotated. The accumulated deposits fall downward toward the suction pipes 438. Each row of tubes 422 is in turn sprayed and rotated, until the filter has been cleaned.

It should thus be appreciated that the present invention is particularly well suited for filtering large quantities of fluid with a low pressure drop. Filter efficiencies on the order of 75 percent with flow rates ranging from tens of thousands to several million pounds per hour can be achieved. A typical filter unit in accordance with the invention would have at least one hundred tubes, each tube having a length of at least several feet.

I claim:

1. A permanent magnet filter, comprising:
   a closed vessel having an inlet plenum, a central filtering region with upstream and downstream ends, and an exit plenum;
   inlet means for supplying raw fluid to the inlet plenum from outside the vessel;
   outlet means for discharging filtered fluid from the vessel;
   means for distributing fluid from the inlet means substantially uniformly over the upstream end of the filter region;
   a plurality of filter tubes located within the filtering region and spaced apart in a substantially uniform array, each tube comprising a nonmagnetic cylindrical outer housing, a plurality of magnetic slugs stacked in the housing, each slug separated from adjacent slugs by a nonmagnetic disk, the slugs being alternatively oriented so that the closest surfaces of adjacent slugs are of the same polarity; and
   means detachably connected to the vessel for supporting the tubes laterally to each other in said array, wherein said means for supporting the tubes comprises a plurality of vertical bars oriented transversely to the longitudinal axis, each bar having two vertical sides, each side having a plurality of scalloped recesses, each recess being substantially semi-circular, such that two adjacent bars form a plurality of substantially circular openings for circumscribing a plurality of tubes.

2. The filter of claim 1 wherein the means for supporting the tubes includes slotted plates mounted on opposite sides of the inner wall of the vessel, the slots being adapted to slidingly receive an end of said bars.

3. The filter of claim 2 wherein means are provided for biasing the outermost bars of the filter region, thereby maintaining a compressive force against the tubes to prevent movement of a tube out of said array during operation of the filter.

4. A permanent filter, comprising:
   a pressure vessel having an inlet plenum, a central filtering region with upstream and downstream ends, and an exit plenum;
   means connected to the vessel interior for supporting a plurality of filter tubes in a substantially uniform array in the filtering region, said means for supporting the tubes engaging the tubes intermediate the ends of the tubes during use and cleaning of the filter to prevent movement of the tubes in the direction of fluid flow in the vessel during normal filtering use, and permit at least a rotational degree of freedom on the tubes during cleaning;
   a plurality of tubes, each comprising a nonmagnetic housing, a plurality of magnetic slugs stacked in the housing, each slug separated from adjacent slugs by a nonmagnetic disk, the slugs being alternatively oriented so that the closest surfaces of adjacent slugs are of the same polarity;
   wherein said means for supporting the tubes are in the form of at least two spaced apart grids, each grid having interlaced strips forming an egg-crate type support structure defining a plurality of openings and wherein each said tube traverses both grids through said openings.

5. The filter of claim 4, wherein the filtering region contains at least about one hundred tubes.

6. The filter of claim 5, wherein each tube is at least about three feet in length.

7. The filter of claim 4, wherein each tube includes means for interacting with at least one of said strips to prevent the tube from sliding through an opening, while the tube rests freely on at least one strip defining said opening.

8. The filter of claim 7, wherein said means to prevent the tube from sliding include an enlargement at the upstream end of the tube.

9. A permanent magnet filter comprising:
   a vertically oriented closed vessel having an inlet plenum, a central filtering region with upstream and downwardly ends, and an exit plenum, the inlet plenum being defined by a detachable head portion of the vessel;
   inlet means for supplying raw fluid to the inlet plenum from outside the vessel;
   outlet means for discharging filtered fluid outside the vessel from the exit plenum;
   means for distributing fluid from the inlet means substantially uniformly over the upstream end of the filter region;
   a plurality of filter tubes located within the filtering region and spaced apart in a substantially uniform array, each tube comprising a nonmagnetic outer housing, a plurality of magnetic slugs stacked in the housing, each slug separated from adjacent slugs by a nonmagnetic disk, the slugs being alternatively oriented so that the closest surfaces of adjacent slugs are of the same plurality;
   a horizontal tube sheet connected between the head and vessel body, for supporting the tubes in a vertical orientation;
   sludge removal means disposed around each tube between the tube sheet and the filter region, mounted in fixed relation to the vessel body; and
   means for lifting the tube sheet and head above the vessel body, whereby as the tubes slide vertically through the respective sludge removal means, the filtered sludge on each tube is scraped off.

10. The filter of claim 9, wherein the vessel is supported on a floor, and wherein the means for lifting the tube sheet comprises:
    alignment means mountable on the vessel body and extending upwardly for guiding the head as the head is lifted, and elevator means supported by the floor and engaging at least one of the head and tube sheet, for lifting at least the tube sheet along the alignment means.

11. The filter of claim 9, further including means within the vessel body for selectively spraying a cleaning fluid onto the inner surface of the vessel to remove sludge deposits thereon.

12. The filter of claim 9 wherein the means for distributing fluid into the filtering region includes a plurality of flow holes in said tube sheet disposed in a regular array between the tubes, each flow hole being of lesser diameter than the diameter of each tube.

13. The filter of claim 12 further comprising:
a ring support plate immediately below the tube sheet;
a ring locking plate immediately below the ring support plate;
said plates being mounted on said vessel body and including a first set of apertures through which the tubes pass and a second set of aligned apertures aligned with the flow holes in the tube sheet; and
wherein said sludge removal means includes a wiper ring captured between the first set of apertures.

14. The filter of claim 13 wherein:
the outlet means is located in the body of the vessel intermediate the head and outlet plenum,
a cylindrical flow skirt is spaced around the plurality of tubes in the filter region, thereby defining an exit flow annulus between the filter region and the vessel body, such that the filtered fluid flows upward from the exit plenum through the flow annulus and through the outlet means.

15. The filter of claim 13 further including a sludge suction pipe at the bottom of the outlet plenum, for withdrawing sludge from the bottom of the vessel.

16. The filter of claim 13 wherein the tubes have a uniform outer diameter in the range of about 2.0-3.0 inches and are arranged in a triangular array with a tube center-to-center spacing in the range of about 2.5-3.5 inches.

17. A permanent magnet filter, comprising:
a closed vessel having an inlet plenum, a central filtering region with upstream and downstream ends, and an exit plenum;
inlet means for supplying raw fluid to the inlet plenum from outside the vessel;
outlet means for discharging filtered fluid from the vessel through the exit plenum;
means for distributing fluid from the inlet means substantially uniformly over the upstream end of the filter region;
a plurality of filter tubes located within the filtering region and spaced apart in a substantially uniform array, each tube comprising a nonmagnetic cylindrical outer housing, a plurality of magnetic slugs stacked in the housing, each slug separated from adjacent slugs by a nonmagnetic disk, the slugs being alternatively oriented so that the closest surfaces of adjacent slugs are of the same polarity, wherein the tubes are oriented horizontally in parallel with the longitudinal axis of the vessel; and
means detachably connected to the vessel for supporting the tubes in said array, said means for supporting including a plurality of horizontal bars oriented transversely to the longitudinal axis, each bar having upper and lower sides, each side having a plurality of scalloped recesses, each recess having a curvature adapted to receive and support a portion of one of the tubes.

18. The filter of claim 17 wherein the means for supporting the tubes includes slotted plates mounted on opposite sides of the inner wall of the vessel, the slots being adapted to slidingly receive one end of said bars.

19. The filter of claim 18 wherein means are provided for biasing the outermost bars of the filter region, thereby maintaining a compressive force against the tubes to prevent movement of a tube out of said array during operation of the filter.

20. The filter of claim 17 wherein the inlet plenum extends from the top of the vessel to the front end thereof and the outlet plenum extends from the bottom of the vessel to the back end thereof, the filter further comprising:
first baffle means for fluidly isolating the inlet plenum from the outlet plenum at the front of the vessel;
second baffle means for fluidly isolating the inlet plenum from the outlet plenum at the back end of the vessel;
said filtering region occupying a space between the front and back ends of the vessel intermediate the first and second baffles, whereby the fluid flow through said filtering region is in the front to back direction parallel to said axis and to the tube centerlines.

21. A permanent magnet filter comprising:
a closed, horizontally oriented vessel having a longitudinal axis, an inlet plenum, a central filtering region with upstream and downstream ends, and an exit plenum;
inlet means for supplying raw fluid to the inlet plenum from outside the vessel;
outlet means for discharging filtered fluid from the vessel through the exit plenum;
means for distributing fluid from the inlet means substantially uniformly over the upstream end of the filter region;
a plurality of filter tubes located within the filtering region and spaced apart in a substantially uniform array wherein the tubes are oriented transversely to the longitudinal axis, each tube comprising a nonmagnetic cylindrical outer housing, a plurality of magnetic slugs stacked in the housing, each slug separated from adjacent slugs by a nonmagnetic disk, the slugs being alternately oriented so that the closest surfaces of adjacent slugs are of the same plurality; and
means detachably connected to the vessel for supporting the tubes in said array, said means for supporting including a plurality of vertically oriented bars, each bar having two sides, each side having a plurality of scalloped recesses, each recess adapted to receive and support a portion of one of the tubes.

22. The filter of claim 21 further including a distribution header located in the inlet plenum and fluidly connected to the inlet nozzle, said header being located above and extending over the filter region in a direction parallel to the longitudinal axis of the vessel, said header including said means for distributing fluid from the inlet means substantially uniformly over the upstream end of the filter region.

23. The filter of claim 22, further including baffle means extending from the lateral portions of the filter region for fluidly separating the inlet plenum from the outlet plenum, whereby the inlet fluid from said distribution header flows through said filter region in a direction transverse to the longitudinal axis of the vessel and the centerlines of the tubes.

* * * * *